(12) United States Patent
Kondo et al.

(10) Patent No.: US 8,116,593 B2
(45) Date of Patent: Feb. 14, 2012

(54) IMAGE PROCESSING APPARATUS, IMAGE PROCESSING METHOD, AND PROGRAM FOR DETERMINING A ZOOM AREA FOR A DISPLAYED ZOOM IMAGE

(75) Inventors: Tetsujiro Kondo, Tokyo (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1021 days.

(21) Appl. No.: 12/040,403

(22) Filed: Feb. 29, 2008

(65) Prior Publication Data

US 2008/0260248 A1    Oct. 23, 2008

(30) Foreign Application Priority Data

Apr. 23, 2007    (JP) ................................. 2007-112905

(51) Int. Cl.
*G06K 9/32* (2006.01)

(52) U.S. Cl. ........ 382/298; 382/118; 382/293; 345/660; 345/671; 348/561; 708/208

(58) Field of Classification Search .................. 382/118, 382/276, 301, 293, 299, 254; 348/207.99, 348/376

See application file for complete search history.

(56) References Cited

U.S. PATENT DOCUMENTS

2003/0099397 A1* 5/2003 Matsugu et al. .............. 382/173

FOREIGN PATENT DOCUMENTS

| JP | 4-266280 | 9/1992 |
|---|---|---|
| JP | 7-37115 | 2/1995 |
| JP | 2000-149026 | 5/2000 |
| JP | 2000-258832 | 9/2000 |
| JP | 2001-126055 | 5/2001 |
| JP | 2001-136358 | 5/2001 |
| JP | 2005-65265 | 3/2005 |
| JP | 2006-154164 | 6/2006 |

* cited by examiner

*Primary Examiner* — Brian Q Le
*Assistant Examiner* — Edward Park
(74) *Attorney, Agent, or Firm* — Oblon, Spivak, McClelland, Maier & Neustadt, L.L.P.

(57) ABSTRACT

An image processing apparatus includes display means for displaying a zoom image resulting from enlargement of a certain area in an original image to a zoom area; important object determining means for determining whether the absolute value of the difference in pixel value between a pixel on a boundary line, which is the outermost circumference of the zoom area, and the pixel that adjoins the pixel on the boundary line in the direction perpendicular to the boundary line and outward from the zoom area is lower than or equal to a predetermined threshold value to determine whether any important object is across the boundary line; and resetting means for resetting a zoom parameter used for determining the zoom area if the important object determining means determines that any important object is across the boundary line.

9 Claims, 11 Drawing Sheets

FIG. 1

ENLARGEMENT

IMAGE PROCESSING APPARATUS, IMAGE PROCESSING METHOD, AND PROGRAM FOR DETERMINING A ZOOM AREA FOR A DISPLAYED ZOOM IMAGE

CROSS REFERENCES TO RELATED APPLICATIONS

The present invention contains subject matter related to Japanese Patent Application JP 2007-112905 filed in the Japanese Patent Office on Apr. 23, 2007, the entire contents of which are incorporated herein by reference.

BACKGROUND OF THE INVENTION

1. Field of the Invention

The present invention relates to image processing apparatuses, image processing methods, and programs. More particularly, the present invention relates to an image processing apparatus, an image processing method, and a program that are capable of user-friendly display of zoom images.

2. Description of the Related Art

Some image processing apparatuses display partial areas of certain images in the display screens, such as monitors, instead of displaying the certain images in the original sizes generated from image signals that are input. The images in the original sizes are hereinafter referred to as original images.

For example, some image processing apparatuses cut out upper and lower partial areas of original images having an aspect ratio of 4:3 to display images having an aspect ratio of 16:9 in the display screens. Some image processing apparatuses display zoom images resulting from enlargement of part (certain areas) of original images in the display screens.

In the display of images in such image processing apparatuses, objects having important content among the objects appearing in original images are not possibly fit in the display screens. In other words, part of the important objects possibly disappears from the display screens.

In order to resolve the above problems, for example, when upper and lower partial areas of original images having an aspect ratio of 4:3 are cut out to display images having an aspect ratio of 16:9 in the display screens, some image processing apparatuses enable horizontal and vertical scrolling of the images displayed in the display screens to allow users to confirm the upper and lower areas of the original images having an aspect ratio of 4:3, which are not displayed in the display screens (for example, refer to Japanese Unexamined Patent Application Publication No. 4-266280).

SUMMARY OF THE INVENTION

However, it is troublesome to scroll each image that is displayed or to change the display magnification of each enlarged image. In addition, users sometimes feel discomfort because all the important information is not displayed in the display screens.

It is desirable to realize user-friendly display of zoom images.

According to an embodiment of the present invention, an image processing apparatus includes display means for displaying a zoom image resulting from enlargement of a certain area in an original image to a zoom area; important object determining means for determining whether the absolute value of the difference in pixel value between a pixel on a boundary line, which is the outermost circumference of the zoom area, and the pixel that adjoins the pixel on the boundary line in the direction perpendicular to the boundary line and outward from the zoom area is lower than or equal to a predetermined threshold value to determine whether any important object is across the boundary line; and resetting means for resetting a zoom parameter used for determining the zoom area if the important object determining means determines that any important object is across the boundary line.

The important object determining means may sequentially perform the determination of whether the absolute value of the difference in pixel value between the pixels adjoining to each other in the direction perpendicular to the boundary line is lower than or equal to the predetermined threshold value outwardly from a pixel on the boundary line to output the number of times the absolute value of the difference is determined to be lower than or equal to the predetermined threshold value. The resetting means may reset the zoom parameter on the basis of the output number of times.

According to another embodiment of the present invention, an image processing method displaying a zoom image resulting from enlargement of a certain area in an original image to a zoom area in certain displaying means includes the steps of determining whether the absolute value of the difference in pixel value between a pixel on a boundary line, which is the outermost circumference of the zoom area, and the pixel that adjoins the pixel on the boundary line in the direction perpendicular to the boundary line and outward from the zoom area is lower than or equal to a predetermined threshold value to determine whether any important object is across the boundary line; and resetting a zoom parameter used for determining the zoom area if it is determined that any important object is across the boundary line.

According to another embodiment of the present invention, a program causing a computer to perform image processing in which a zoom image resulting from enlargement of a certain area in an original image to a zoom area is displayed in certain displaying means includes the steps of determining whether the absolute value of the difference in pixel value between a pixel on a boundary line, which is the outermost circumference of the zoom area, and the pixel that adjoins the pixel on the boundary line in the direction perpendicular to the boundary line and outward from the zoom area is lower than or equal to a predetermined threshold value to determine whether any important object is across the boundary line; and resetting a zoom parameter used for determining the zoom area if it is determined that any important object is across the boundary line.

According to the above embodiments of the present invention, it is determined whether the absolute value of the difference in pixel value between a pixel on a boundary line, which is the outermost circumference of the zoom area, and the pixel that adjoins the pixel on the boundary line in the direction perpendicular to the boundary line and outward from the zoom area is lower than or equal to a predetermined threshold value to determine whether any important object is across the boundary line. If it is determined that any important object is across the boundary line, a zoom parameter used for determining the zoom area is reset.

According to the present invention, it is possible to realize user-friendly display of zoom images.

DESCRIPTION OF THE PREFERRED EMBODIMENTS

Before describing embodiments of the present invention, the correspondence between the features of the claims and the specific elements disclosed in the embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing apparatus (for example, an image processing apparatus 1 in FIG. 4) according to an embodiment of the present invention includes display means for displaying a zoom image resulting from enlargement of a certain area in an original image to a zoom area; important object determining means (for example, an important object detecting unit 13 in FIG. 4) for determining whether the absolute value of the difference in pixel value between a pixel on a boundary line, which is the outermost circumference of the zoom area, and the pixel that adjoins the pixel on the boundary line in the direction perpendicular to the boundary line and outward from the zoom area is lower than or equal to a predetermined threshold value to determine whether any important object is across the boundary line; and resetting means (for example, a zoom area resetting unit 14 in FIG. 4) for resetting a zoom parameter used for determining the zoom area if the important object determining means determines that any important object is across the boundary line.

Figure 7:
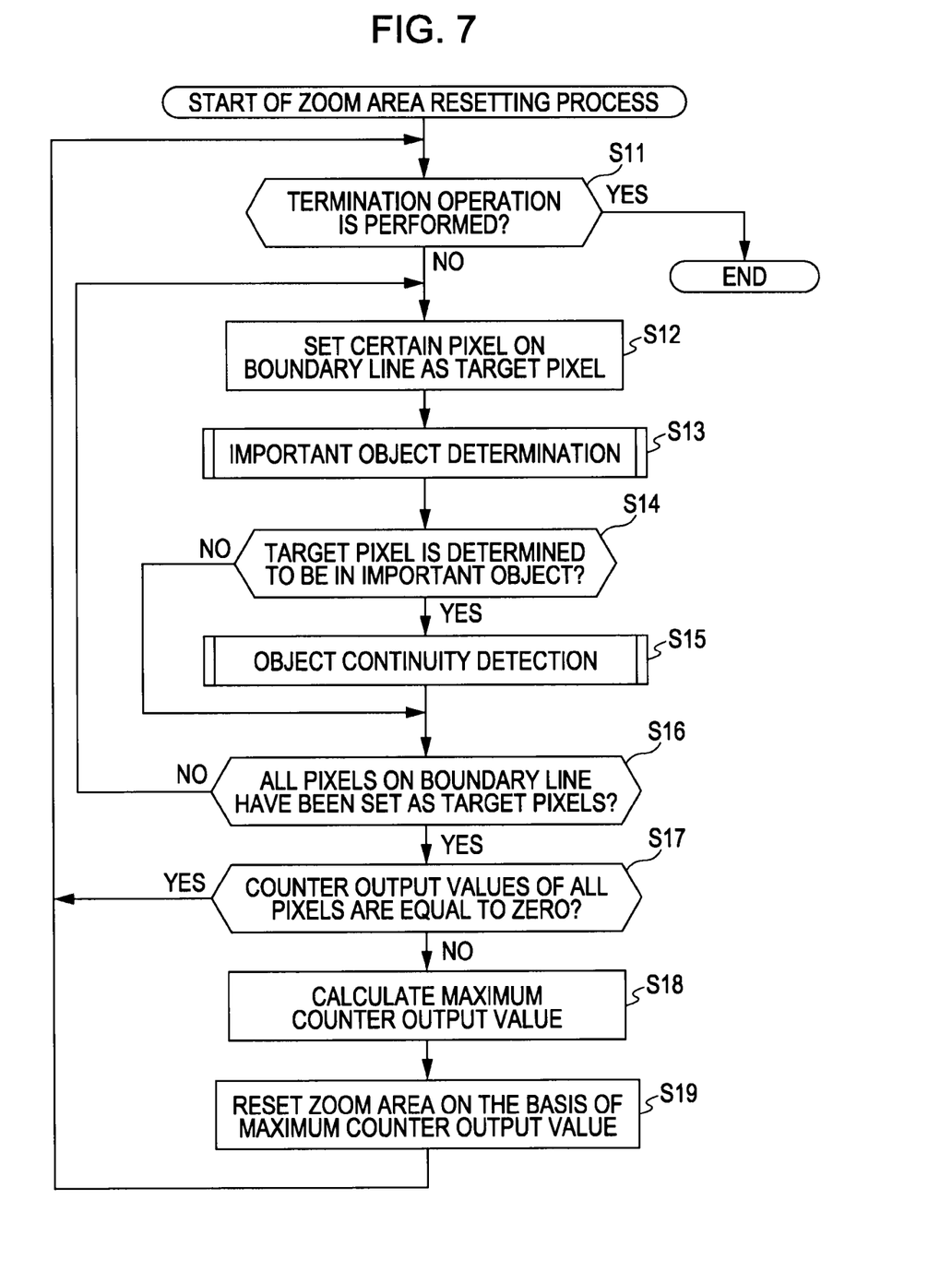
FIG. 7 is a flowchart showing an example of a zoom area resetting process in the image processing apparatus according to an embodiment of the present invention.

An image processing method displaying a zoom image resulting from enlargement of a certain area in an original image to a zoom area in certain displaying means or a program causing a computer to perform the above process, according to another embodiment of the present invention, includes the steps of determining whether the absolute value of the difference in pixel value between a pixel on a boundary line, which is the outermost circumference of the zoom area, and the pixel that adjoins the pixel on the boundary line in the direction perpendicular to the boundary line and outward from the zoom area is lower than or equal to a predetermined threshold value to determine whether any important object is across the boundary line (for example, Step S15 in FIG. 7); and resetting a zoom parameter used for determining the zoom area if it is determined that any important object is across the boundary line (for example, Step S19 in FIG. 7).

Embodiments of the present invention will herein be described with reference to the attached drawings.

A summary of processes performed by an image processing apparatus (an image processing apparatus 1 described below with reference to FIG. 4) to which the present invention is applied will now be described with reference to FIGS. 1 to 3.

Figure 1:
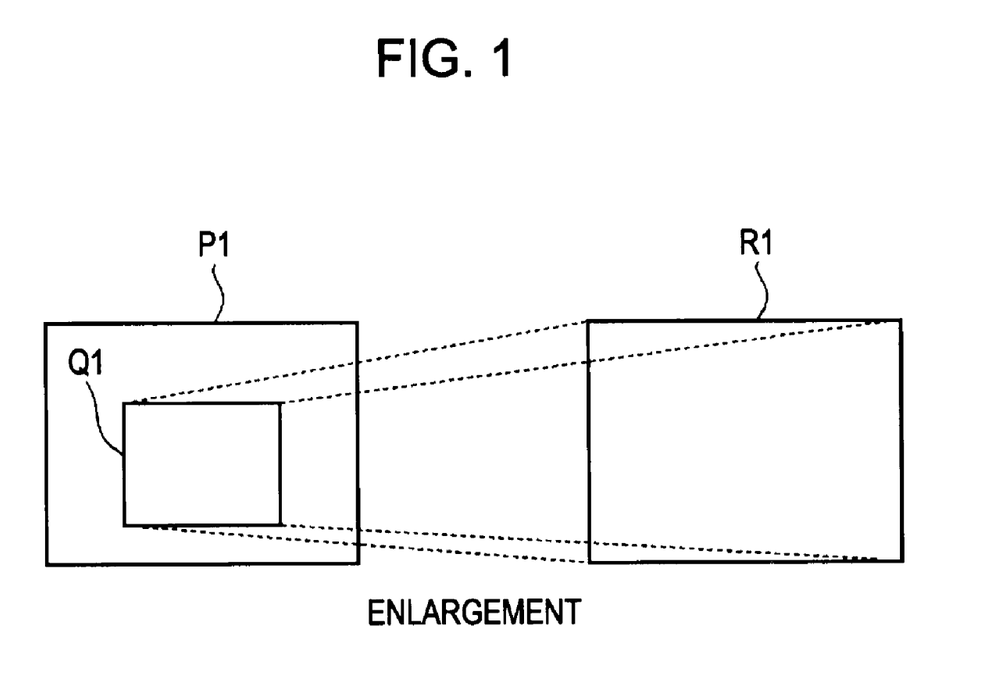
FIG. 1 is illustrates a zooming process performed by an image processing apparatus according to an embodiment of the present invention.

FIG. 1 illustrates a zooming process performed by the image processing apparatus 1.

The image processing apparatus 1 enlarges a partial area Q1 of an original image P1 generated from an image signal that is input at a predetermined magnification (zoom magnification) to the same size as that of the display screen of a display device and displays a zoom image R1 resulting from the enlargement in the display screen. The size of the original image P1 is equal to that of the display screen.

Figure 2:
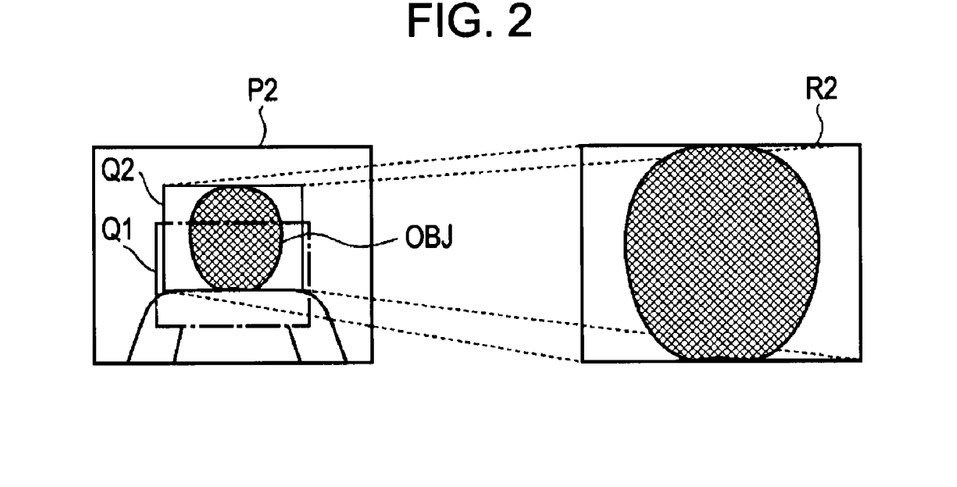
FIG. 2 illustrates a process of resetting a zoom area in the image processing apparatus according to the embodiment of the present invention.

It is assumed that the scene of the displayed image is changed at a certain timing to supply an original image P2 shown in FIG. 2 to the image processing apparatus 1. An object OBJ appears in the original image P2. The object OBJ represents, for example, a certain person and the meshed area of the object OBJ represents the head of the person. Referring to FIG. 2, although the partial area Q1 surrounded by a dotted chain line is the same area as the partial area Q1 in FIG. 1, the area Q1 in FIG. 2 is slightly enlarged so that the area Q1 can be discriminated from an area Q2 described below.

When the original image P2 shown in FIG. 2 is supplied to the image processing apparatus 1, the direct enlargement of the image in the area Q1 to display the image in the display screen results in an image that a user may not easily identify because the object OBJ is not fit in the area Q1. As a result, the zooming has adverse effect.

Accordingly, when the original image P2 is supplied as an image signal, the image processing apparatus 1 resets the zoom area from the area Q1 to the area Q2 to display a zoom image R2 resulting from enlargement of the area Q2 in the display screen, as shown on the right side of FIG. 2. The area Q2 is given by shifting the area Q1 vertically (upward in FIG. 2) by a predetermined amount.

Figure 3:
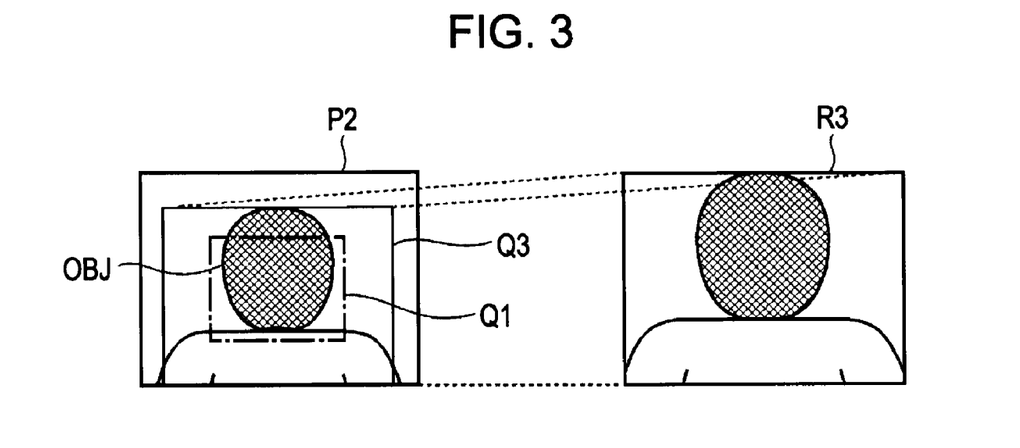
FIG. 3 illustrates a process of changing a zoom magnification in the image processing apparatus according to the embodiment of the present invention.

Alternatively, as shown in FIG. 3, the image processing apparatus 1 changes (increases) the zoom magnification to reset the area Q1 to an area Q3 in which the object OBJ can be fit and displays a zoom image R3 resulting from the enlargement of the area Q3 in the display screen, as shown on the right side in FIG. 3.

Figure 4:
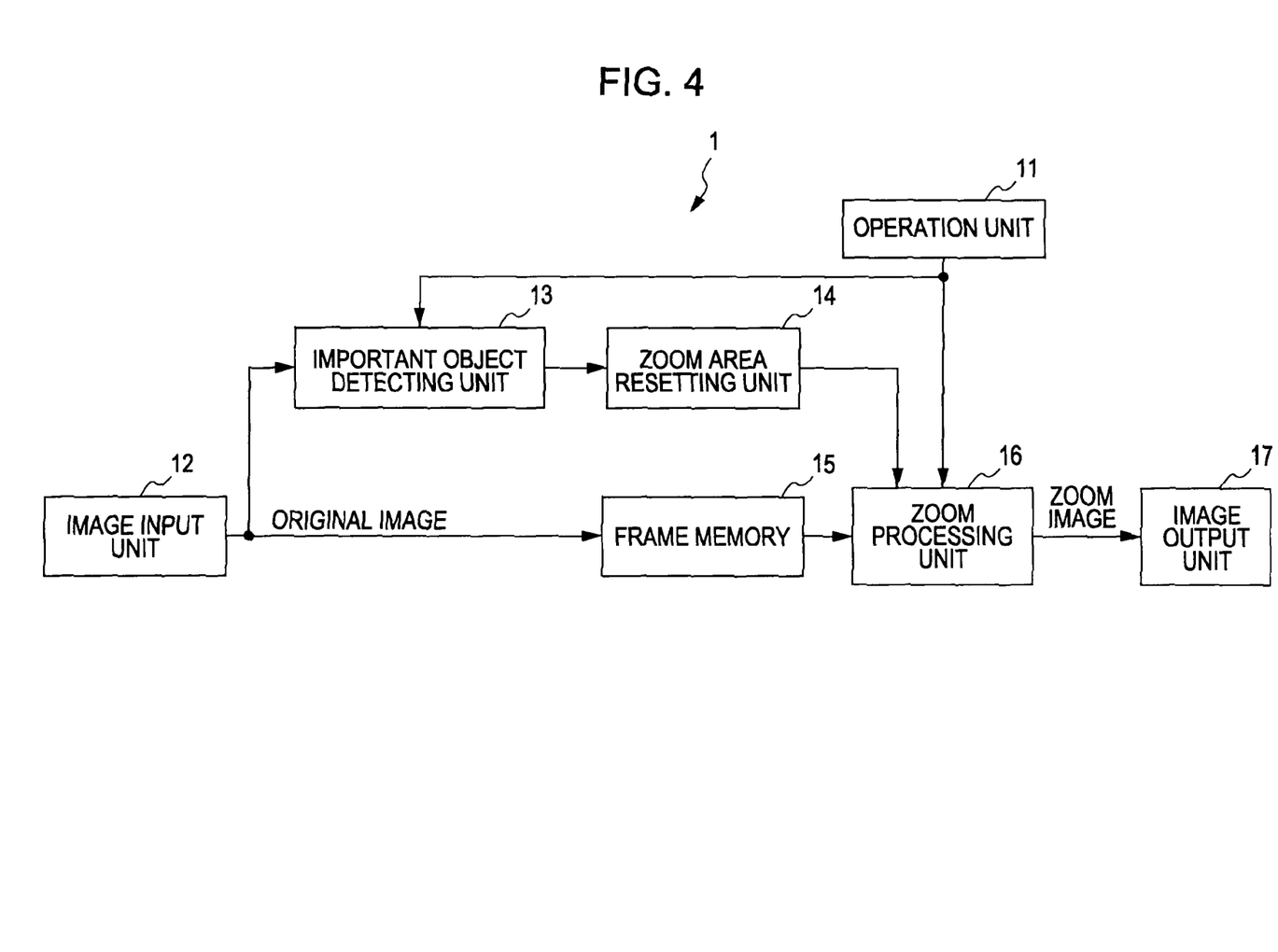
FIG. 4 is a block diagram showing an example of the configuration of the image processing apparatus according to the embodiment of the present invention.

FIG. 4 is a block diagram showing an example of the configuration of the image processing apparatus 1 according to an embodiment of the present invention.

The image processing apparatus 1 includes an operation unit 11, an image input unit 12, an important object detecting unit 13, a zoom area resetting unit 14, a frame memory 15, a zoom processing unit 16, and an image output unit 17. The image processing apparatus 1 is, for example, a recording-playback apparatus that records an image on a recording medium, such as a television receiver, a hard disk, or a digital versatile disk (DVD), and plays back an image recorded on the recording medium. The image processing apparatus 1 is capable of displaying an image based on an image signal received from an external apparatus or an image signal recorded in the image processing apparatus 1 in a certain display device.

The operation unit 11 corresponds to, for example, a remote commander or operational buttons that are provided in the image processing apparatus 1 and that receive user's operations. The remote commander instructs the operation of the image processing apparatus 1 from a position apart from the image processing apparatus 1 by, for example, infrared data communication. The operation unit 11 supplies the operation signal corresponding to a user's operation to the important object detecting unit 13 and the zoom processing unit 16. For example, when the operational button for zooming is operated, the operation unit 11 supplies a zoom signal of a parameter indicating the zoom magnification or a position specification parameter used for specifying the zoom area to the important object detecting unit 13 and the zoom processing unit 16. The position specification parameter indicates the center position and length of the zoom area or the diagonal coordinate of the zoom area.

The image input unit 12 corresponds to, for example, a tuner receiving a television broadcast signal, such as a ground wave or a satellite wave, or an external input terminal through which an image signal is input from an external apparatus. The image input unit 12 supplies the received or input image signal to the important object detecting unit 13 and the frame memory 15. An image directly generated from the image signal output from the image input unit 12 is hereinafter referred to as an original image.

The important object detecting unit 13 determines the zoom area for the original image supplied from the image input unit 12 on the basis of the zoom signal supplied from the operation unit 11. The outermost circumference of the zoom area determined here serves as the boundary line between the zoom image displayed in the display screen of a certain display device and the other parts.

The important object detecting unit 13 determines whether any important object is across the boundary line. Specifically, the important object detecting unit 13 sets each pixel on the boundary line as a target pixel and performs an object continuity detection step to the target pixel to detect any important object across the boundary line. In the object continuity detection, it is sequentially determined whether the absolute value of the difference in pixel value between two adjoining pixels in the direction perpendicular to the boundary line is lower than or equal to a predetermined threshold value $\epsilon_1$ from the pixel (that is, the target pixel) on the boundary line, as described below with reference to FIG. 6.

The important object corresponds to, for example, a person image area in which a person appears in the original image; an artificial image area corresponding to a telop (superimposition) that indicates a text, such as emergency news or the destination of an application, superimposed on the original image; or a non-background image area other than a background area in the original image composed of a foreground, the background, and so on.

The zoom area resetting unit 14 supplies a zoom signal used for resetting the zoom area, which is substituted for the zoom signal supplied from the operation unit 11 to the zoom processing unit 16, to the zoom processing unit 16 if it is determined that the resetting of the zoom area is necessary on the basis of the determination result supplied from the important object detecting unit 13.

Figure 5A:
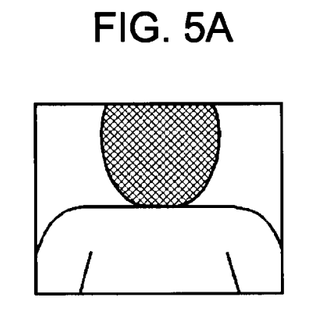
FIGS. 5A and 5B illustrate a state in which an important object is beyond the zoom area.
Figure 5B:
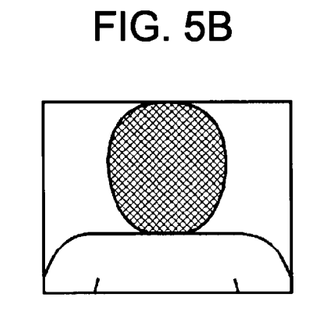

It is determined that the resetting of the zoom area is necessary, for example, when the important object is beyond the zoom area, as shown in FIG. 5A. It is determined that the resetting of the zoom area is not necessary, for example, when the important object is fit in the zoom area (when the important object is not beyond the zoom area), as shown in FIG. 5B. If the important object is fit in the zoom area, no zoom signal is supplied from the zoom area resetting unit 14 to the zoom processing unit 16. Accordingly, the zoom area corresponding to the user's operation is continued to be displayed in the display screen.

Referring back to FIG. 4, the frame memory 15 temporarily stores the original image supplied from the image input unit 12 to delay the supply of the original image to the downstream zoom processing unit 16 for a predetermined time. Specifically, the frame memory 15 delays the original image supplied from the image input unit 12 for the time period in which the zoom signals corresponding to the zoom area after the resetting are supplied from the zoom area resetting unit 14 to the zoom processing unit 16 if it is determined that the resetting of the zoom area is necessary on the basis of the determination result of the important object in the important object detecting unit 13.

The zoom processing unit 16 determines the zoom area for the original image supplied from the frame memory 15 on the basis of the zoom signal supplied from the operation unit 11 or the zoom area resetting unit 14 and supplies the zoom image, which results from enlargement of the zoom area to the same size as that of the display screen of the display device, to the image output unit 17.

The image output unit 17 corresponds to, for example, a display device, such as a cathode ray tube (CRT) or a liquid crystal display (LCD), or an external output terminal through which an image signal is output to an external display device. The image output unit 17 displays or outputs the zoom image supplied from the zoom processing unit 16.

The image processing apparatus 1 having the configuration described above sets the zoom area on the basis of a user's operation. However, if an important object in the input original image is beyond the zoom area in the display screen, the zoom area is reset so that the important object is not beyond the zoom area.

The object continuity detection performed by the important object detecting unit 13 will now be described with reference to FIG. 6.

Figure 6:
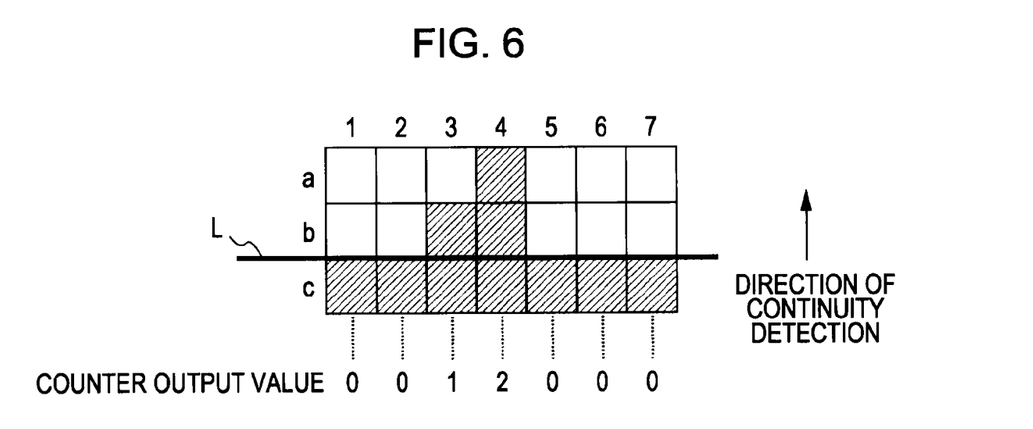
FIG. 6 illustrates how to perform an object continuity detection step.

FIG. 6 shows a certain area in an original image, including 21 pixels, three rows (a, b, and c)×seven columns (1 to 7).

In the example shown in FIG. 6, shaded pixels represent pixels in an important object area. The multiple shaded pixels have the approximately same values, and the absolute value of the difference in pixel value between the shaded pixels is lower than or equal to the predetermined threshold value $\epsilon_1$ described below. The pixel values of the shaded pixels are greatly different from those of pixels that are not shaded. In other words, the absolute value of the difference in pixel value between the shaded pixel and the pixel that is not shaded is higher than the threshold value $\epsilon_1$.

The zoom area expands from a lower portion in FIG. 6 (not shown) to the c row. Accordingly, an upper boundary line L of the rectangular zoom area corresponds to the c row. In other words, the pixel row on the outermost circumference of the zoom area corresponds to the c row. The boundary line L is shown between the b row and the c row in the example in FIG. 6 for simplicity.

In the object continuity detection, the important object detecting unit 13 first sets a certain pixel on the boundary line as the target pixel to be processed. For example, the pixel in the c row and the second column (the pixel is hereinafter appropriately described by using the row and column numbers, for example, the pixel c2) is set as the target pixel. The important object detecting unit 13 initializes a counter (variable) to zero. The counter calculates how much the important object extends from the current zoom area.

Next, the important object detecting unit 13 sets the target pixel c2 as a reference pixel and calculates the absolute value of the difference in pixel value between the reference pixel c2 and a pixel b2 that adjoins the reference pixel c2 in the direction perpendicular to the boundary line and outward from the zoom area. The important object detecting unit 13 determines whether the absolute value of the difference in pixel value between the reference pixel c2 and the pixel b2 is lower than or equal to the threshold value $\epsilon_1$. If the important object detecting unit 13 determines that the absolute value of the difference in pixel value between the reference pixel c2 and the pixel b2 is higher than the threshold value $\epsilon_1$, the important object detecting unit 13 terminates the object continuity detection with respect to the target pixel c2. If the important object detecting unit 13 determines that absolute value of the difference in pixel value between the reference pixel c2 and the pixel b2 is lower than or equal to the threshold value $\epsilon_1$, the important object detecting unit 13 sets the pixel b2, which has been compared with the reference pixel c2, as the next reference pixel and repeats the above process.

Since the absolute value of the difference in pixel value between the reference pixel c2 and the pixel b2 is higher than the threshold value $\epsilon_1$ in the example shown in FIG. 6, the current value of the counter is supplied to the zoom area resetting unit 14 as the determination result for the target pixel c2 and the object continuity detection for the target pixel c2 is terminated. The value of the counter (counter output value) for the target pixel c2, to be supplied to the zoom area resetting unit 14, is equal to zero.

Next, the important object detecting unit 13 set a pixel on the boundary line L, which has not been set as the target pixel, as the target pixel. For example, a pixel c3 is set as the target pixel. The important object detecting unit 13 sets the target pixel c3 as the reference pixel and determines whether the absolute value of the difference in pixel value between the reference pixel c3 and a pixel b3 that adjoins the reference pixel c3 in the direction perpendicular to the boundary line and outward from the zoom area is lower than or equal to the threshold value $\epsilon_1$.

Since the determination shows that the absolute value of the difference in pixel value between the reference pixel c3 and the pixel b3 outside the pixel c3 is lower than or equal to the threshold value $\epsilon_1$, the important object detecting unit 13 sets the pixel b3 that has been compared with the reference pixel c3 as the next reference pixel and increments the counter by one to set the counter to one. The important object detecting unit 13 determines whether the absolute value of the difference in pixel value between the reference pixel b3 and a pixel a3 that adjoins the reference pixel b3 in the direction perpendicular to the boundary line and outward from the zoom area is lower than or equal to the threshold value $\epsilon_1$.

Since the determination shows that the absolute value of the difference in pixel value between the reference pixel b3 and the pixel a3 outside the pixel b3 is higher than the threshold value $\epsilon_1$, the important object detecting unit 13 supplies the value of the counter to the zoom area resetting unit 14 and terminates the object continuity detection with respect to the target pixel c3. The counter output value supplied to the zoom area resetting unit 14 is equal to one.

All the pixels including the pixels c4, c5, c6, c7, . . . on the boundary line are sequentially set as the target pixels in the manner described above, the object continuity detection is performed with respect to each target pixel, and the counter output value resulting from the object continuity detection is supplied to the zoom area resetting unit 14. The counter output value indicates the number of times the absolute value of the difference in pixel value is determined to be lower than or equal to the threshold value $\epsilon_1$.

Accordingly, the zoom area resetting unit 14 can check the maximum counter output value supplied from the important object detecting unit 13 to determine how much the boundary line is to be shifted or the zoom area is to be expanded in the four directions, that is, upward, downward, leftward, and rightward.

FIG. 7 is a flowchart illustrating an example of a zoom area resetting process in which the zoom area is reset in accordance with the position of the important object in the zoom area. It is assumed that the user sets a certain zoom area in advance before the zoom area resetting process.

Referring to FIG. 7, in Step S11, it is determined whether the user performs a termination process. If it is determined that the user performs the termination process, the zoom area resetting process is terminated.

If it is determined that the user does not perform the termination process, then in Step S12, the important object detecting unit 13 sets a certain pixel on the boundary line as the target pixel to be processed.

In Step S13, the important object detecting unit 13 performs an important object determination step to determine whether the target pixel is in an important object. The important object determination will be described in detail below with reference to FIGS. 8 to 10. For example, the important object detecting unit 13 determines whether the target pixel is included in the person image area, the artificial image area, or the non-background image area described above to determine whether the target pixel is in the important object.

In Step S14, the important object detecting unit 13 determines whether the target pixel is determined to be in the important object in the important object determination. If the important object detecting unit 13 determines that the target pixel is determined not to be in the important object, Step S15 is skipped.

If the important object detecting unit 13 determines in Step S14 that the target pixel is determined to be in the important object in the important object determination, then in Step S15, the important object detecting unit 13 performs the object continuity detection described above with reference to FIG. 6 to the target pixel. In the object continuity detection, the important object detecting unit 13 calculates how much the important object extends from the zoom area in the direction perpendicular to the boundary line and outward from the zoom area (calculates the counter output value) at the target pixel and supplies the calculated value to the zoom area resetting unit 14.

In Step S16, the important object detecting unit 13 determines whether all the pixels on the boundary line have been set as the target pixels. If the important object detecting unit 13 determines that all the pixels on the boundary line have not been set as the target pixels, that is, if the counter output values have not been calculated for all the pixels on the boundary line, the process goes back to Step S12 to repeat Steps S12 to S16. As a result, the pixels on the boundary line, which have not been set as the target pixels, are set as the target pixels and the counter output values for the set target pixels are supplied to the zoom area resetting unit 14.

If the important object detecting unit 13 determines in Step S16 that all the pixels on the boundary line have been set as the target pixels, then in Step S17, the zoom area resetting unit 14 determines whether the counter output values of all the pixels on the boundary line, supplied from the important object detecting unit 13, are equal to zero.

If the zoom area resetting unit 14 determines that the counter output values of all the pixels on the boundary line are equal to zero, the process goes back to Step S11 to repeat the subsequent steps. The case where the counter output values of all the pixels on the boundary line are equal to zero corresponds to a case where the important object is not across the boundary line (the important object is not beyond the zoom area). In such a case, since it is not necessary to reset the zoom area set by the user's operation, the process goes back to Step S11.

If the zoom area resetting unit 14 determines in Step S17 that the counter output values of all the pixels on the boundary line are not equal to zero, then in Step S18, the zoom area resetting unit 14 calculates the maximum value in the counter output values of all the pixels on the boundary line, supplied from the important object detecting unit 13.

In Step S19, the zoom area resetting unit 14 resets the zoom area on the basis of the maximum value calculated in Step S18. Specifically, the zoom area resetting unit 14 supplies the zoom signals corresponding to the zoom area from which the important object does not extend on the basis of the maximum value calculated in Step S18 to the zoom processing unit 16. The zoom processing unit 16 determines the zoom area on the basis of the zoom signals and supplies the determined zoom area to the image output unit 17 as the zoom image.

More specifically, the zoom area resetting unit 14 shifts the zoom area in the direction in which the important object extends from the zoom area, as described above with reference to FIG. 2, such that the size of the zoom area is not varied and so that the important object is not beyond the zoom area (by the amount corresponding to the maximum value) on the basis of the maximum value calculated in Step S18. Alternatively, the zoom area resetting unit 14 changes the zoom magnification, as described above with reference to FIG. 3, so that the important object is not beyond the zoom area (by the amount corresponding to the maximum value) on the basis of the maximum value calculated in Step S18.

When the zoom area has been shifted in a certain direction, as described above with reference to FIG. 2, on the basis of the counter output values of all the pixels on the boundary line, the important object can be across the boundary line in the direction opposite to the shift direction. For example, in the example in FIG. 2, since the important object is across the upper boundary line and the important object is beyond the zoom area, the zoom area is shifted upward (from the area Q1 to the area Q2). However, the important object can be across a lower boundary line and can be beyond the zoom area after the shift of the zoom area. In order to prevent such a situation, the object continuity detection may be performed to all the pixels on the boundary line or at least to pixels on the boundary line in the direction opposite to the shift direction after the shift of the zoom area to confirm that the important object is not beyond the zoom area.

If it is determined that the important object is beyond the zoom area after the shift of the zoom area, the zoom magnification may be changed to reset the zoom area again so that the important object is not beyond the zoom area or the changing of the zoom magnification may be performed, instead of the shift of the zoom area, to reset the zoom area. The zoom area resetting unit 14 may acquire information about the original image or the zoom area from the important object detecting unit 13, if needed.

The zoom area resetting process in FIG. 7 is repeated until the display of the zoom image is stopped.

Figure 8:
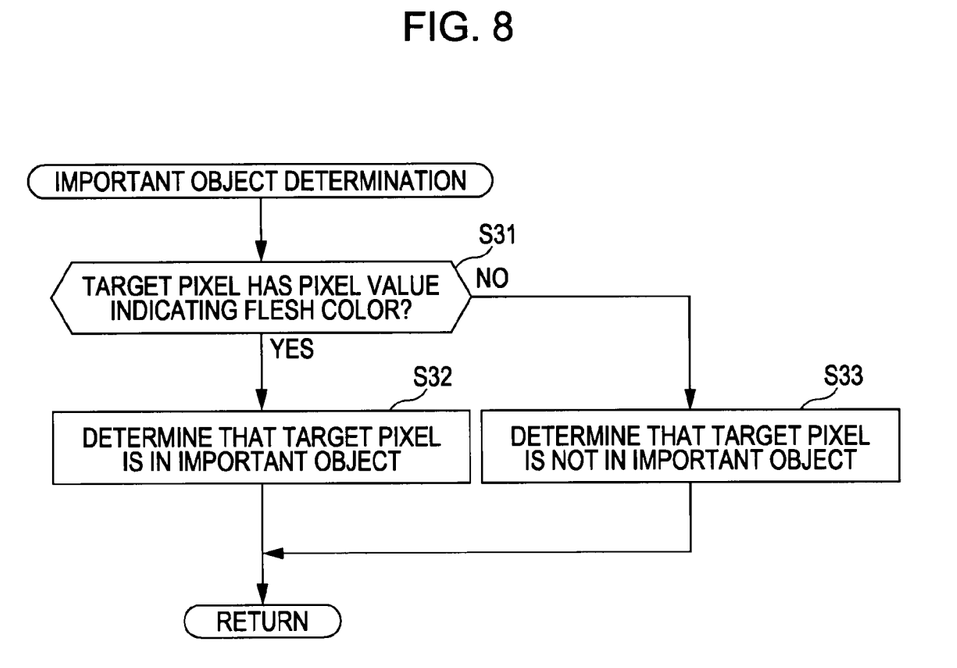
FIG. 8 is a flowchart showing an example of an important object determination step when a person image area is set as the important object according to an embodiment of the present invention.

FIG. 8 is a flowchart showing an example of the important object determination step in Step S13 in FIG. 7 when the person image area is set as the important object.

In Step S31, the important object detecting unit 13 determines whether the target pixel has a pixel value indicating flesh color.

If the important object detecting unit 13 determines that that the target pixel has a pixel value indicating the flesh color, then in Step S32, the important object detecting unit 13 determines that the target pixel is in the important object and goes back to the zoom area resetting process in FIG. 7.

If the important object detecting unit 13 determines in Step S31 that the target pixel does not have a pixel value indicating the flesh color, then in Step S33, the important object detecting unit 13 determines that the target pixel is not in the important object and goes back to the zoom area resetting process in FIG. 7.

Figure 9:
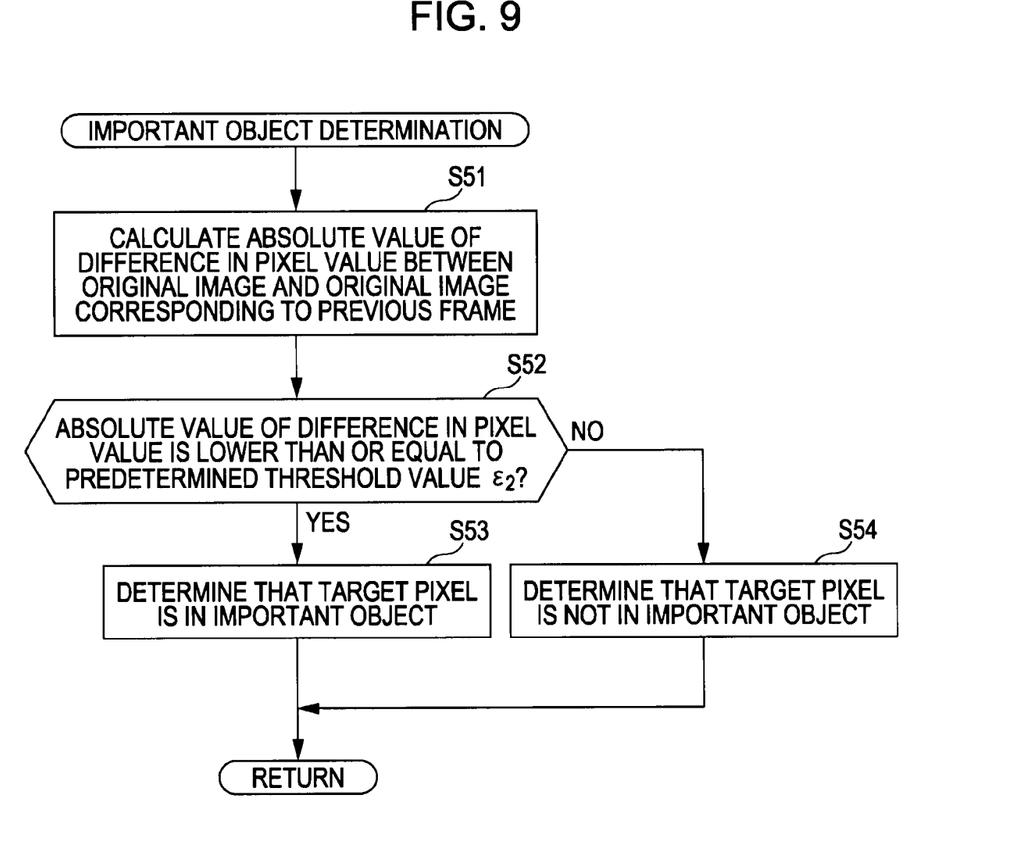
FIG. 9 is a flowchart showing an example of the important object determination step when a non-background image area is set as the important object according to an embodiment of the present invention.

FIG. 9 is a flowchart showing an example of the important object determination step in Step S13 in FIG. 7 when the non-background image area is set as the important object.

In Step S51, the important object detecting unit 13 calculates the absolute value of the difference in pixel value between the original image supplied from the image input unit 12 and the original image corresponding to the previous frame stored in an internal memory (not shown).

In Step S52, the important object detecting unit 13 determines whether the calculated absolute value of the difference is lower than or equal to a predetermined threshold value $\epsilon_2$.

If the important object detecting unit 13 determines that the absolute value of the difference is lower than or equal to the predetermined threshold value $\epsilon_2$, then in Step S53, the important object detecting unit 13 determines that the target pixel is in the important object and goes back to the zoom area resetting process in FIG. 7.

If the important object detecting unit 13 determines that the absolute value of the difference is higher than the predetermined threshold value $\epsilon_2$, then in Step S54, the important object detecting unit 13 determines that the target pixel is not in the important object and goes back to the zoom area resetting process in FIG. 7.

Figure 10:
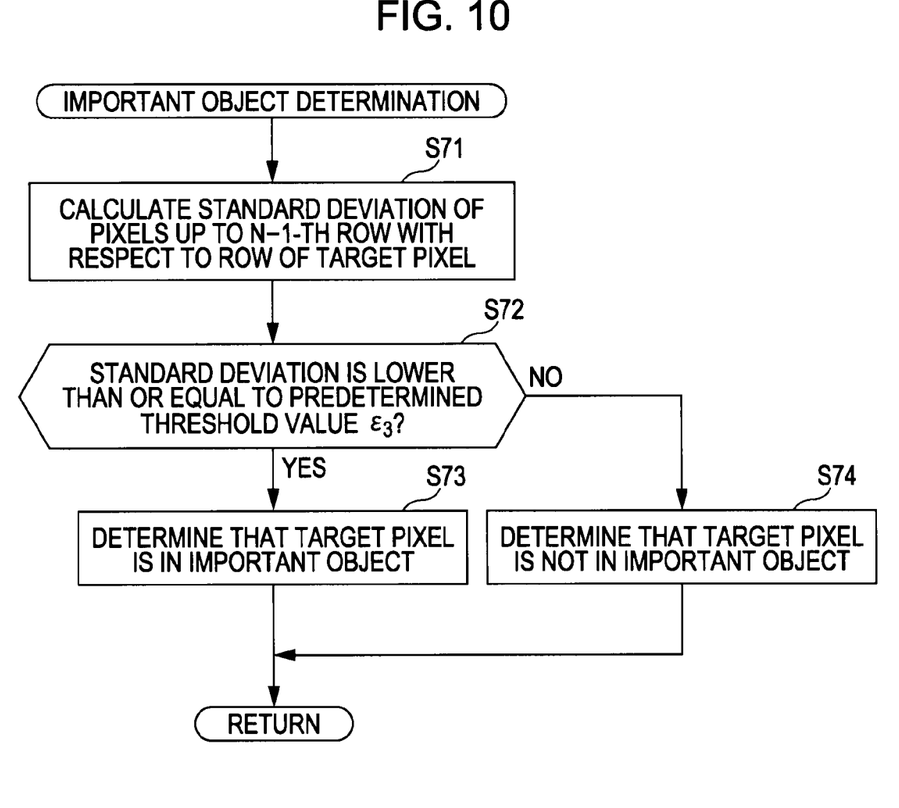
FIG. 10 is a flowchart showing an example of the important object determination step when an artificial image area is set as the important object according to an embodiment of the present invention.

FIG. 10 is a flowchart showing an example of the important object determination step in Step S13 in FIG. 7 when the artificial image area is set as the important object.

In Step S71, the important object detecting unit 13 calculates the standard deviation of the pixels up to the N−1-th row (N>0) from the target pixel in the direction perpendicular to the target pixel. For example, when a telop (superimposition) is displayed as an image, many pixels having the same color (for example, white) should exist in the image area. Accordingly, if the variation (standard deviation) in pixel value between the target pixel and a pixel adjacent to the target pixel is lower than or equal to a predetermined threshold value $\epsilon_3$, the target pixel can be determined to be in the artificial image area, which corresponds to the important object. The pixels targeted for the calculation of the standard deviation may be, for example, m×m pixels in an area around the target pixel, instead of the pixels up to the N−1-th row (N>0) from the target pixel in the direction perpendicular to the target pixel, as long as it is possible to calculate the variation in pixel value between the target pixel and pixels around the target pixel.

In Step S72, the important object detecting unit 13 determines whether the calculated standard deviation is lower than or equal to the threshold value $\epsilon_3$.

If the important object detecting unit 13 determines that the standard deviation is lower than or equal to the threshold value $\epsilon_3$, then in Step 73, the important object detecting unit 13 determines that the target pixel is in the important object and goes back to the zoom area resetting process in FIG. 7.

If the important object detecting unit 13 determines that the standard deviation is higher than the threshold value $\epsilon_3$, then in Step S74, the important object detecting unit 13 determines that the target pixel is not in the important object and goes back to the zoom area resetting process in FIG. 7.

Any one of the important object determination steps in FIGS. 8 to 10 may be performed or multiple important object determination steps may be performed to determine whether the target pixel is in the important object. The determination of whether the target pixel is in the important object may be based on another criterion other than the person image area, the artificial image area, and the non-background image area.

Figure 11:
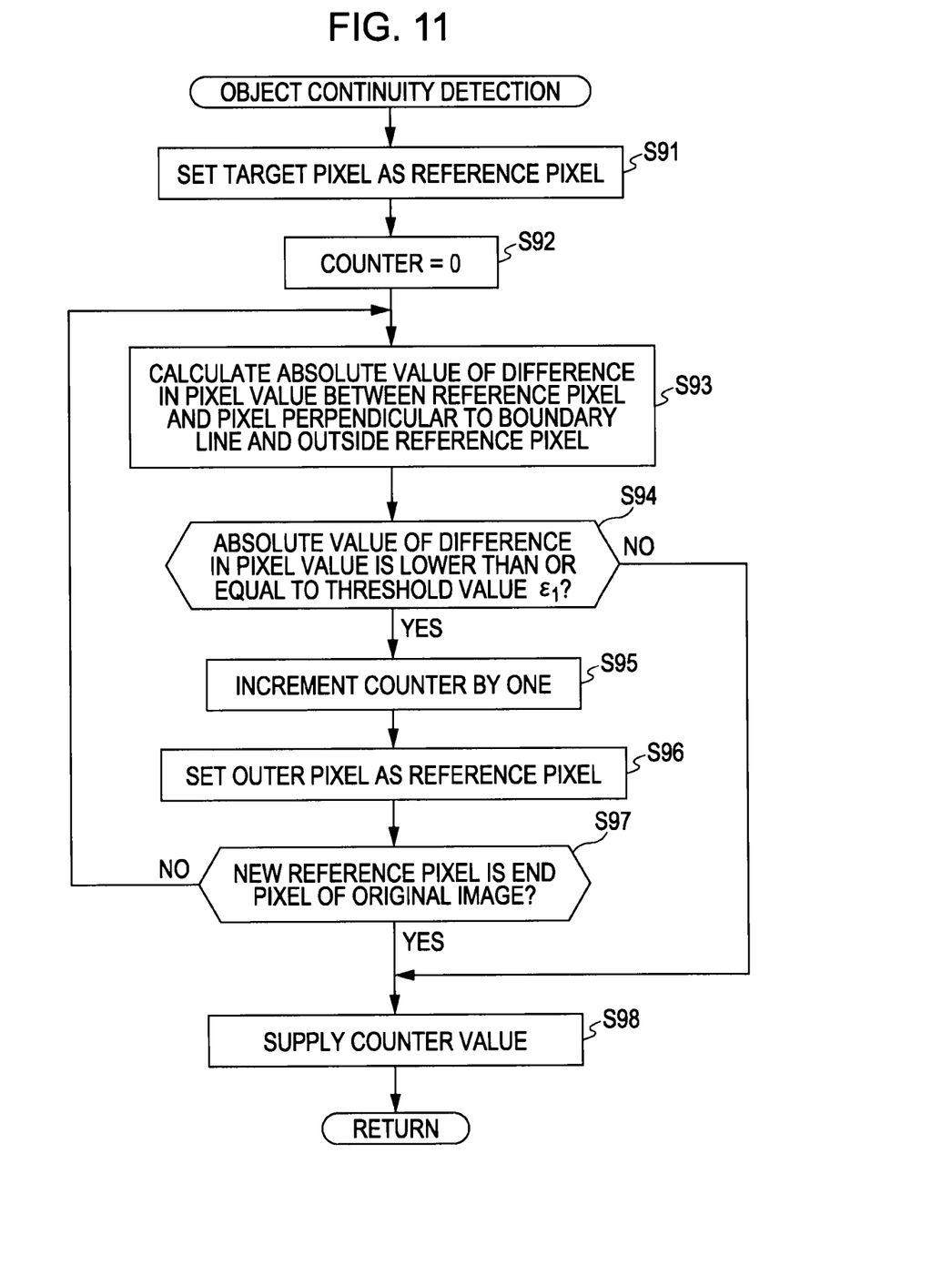
FIG. 11 is a flowchart showing an example of the object continuity detection step according to an embodiment of the present invention.

FIG. 11 is a flowchart showing an example of the object continuity detection step in Step S15 in FIG. 7.

In Step S91, the important object detecting unit 13 sets the target pixel as the reference pixel. In Step S92, the important object detecting unit 13 initializes the counter to zero. The counter calculates how much the important object extends from the current zoom area.

In Step S93, the important object detecting unit 13 calculates the absolute value of the difference in pixel value between the reference pixel and the pixel that is perpendicular to the boundary line and that is outside the reference pixel.

In Step S94, the important object detecting unit 13 determines whether the calculated absolute value of the difference is lower than or equal to the predetermined threshold value $\epsilon_1$.

If the important object detecting unit 13 determines that the absolute value of the difference is higher than the threshold value $\epsilon_1$, the important object detecting unit 13 goes to Step S98.

If the important object detecting unit 13 determines in Step S94 that the absolute value of the difference is lower than or equal to the threshold value $\epsilon_1$, then in Step S95, the important object detecting unit 13 increments the counter by one.

In Step s96, the important object detecting unit 13 sets the outside pixel compared with the reference pixel as a new reference pixel substituted for the old reference pixel.

In Step S97, the important object detecting unit 13 determines whether the object continuity detection is performed up to the outer end of the original image, that is, whether the new reference pixel set in Step S96 is at the outer end (outermost) of the original image.

If the important object detecting unit 13 determines that the object continuity detection is not performed up to the outer end of the original image, the important object detecting unit 13 goes back to Step S93 to perform Steps S93 to S97 to the new reference pixel.

If the important object detecting unit 13 determines in Step S97 that the object continuity detection is performed up to the outer end of the original image, then in Step S98, the important object detecting unit 13 supplies the counter output value to the zoom area resetting unit 14 as the result of the object continuity detection for the target pixel and goes back to the zoom area resetting process in FIG. 7.

As described above, in the zoom area resetting process performed by the image processing apparatus 1 according to the present embodiment, the zoom area is reset so that the important object is not beyond the zoom area to display the reset zoom area in the display screen if the important object is beyond the zoom area when a certain area in the original image is enlarged in response to a user's operation and the enlarged area is displayed as the zoom image in the display screen. Accordingly, it is not necessary for the user to perform the resetting of the zoom area. In addition, the user does not feel discomfort because the user does not miss any important information or does not view only part of the important information because of the important information that is beyond the zoom area. In other words, it is possible to realize user-friendly display of zoom images.

The zoom area before the image processing apparatus 1 performs the zoom area resetting process may be set by the user with the operation unit 11 or may be reset in the zoom area resetting process.

Figure 12:
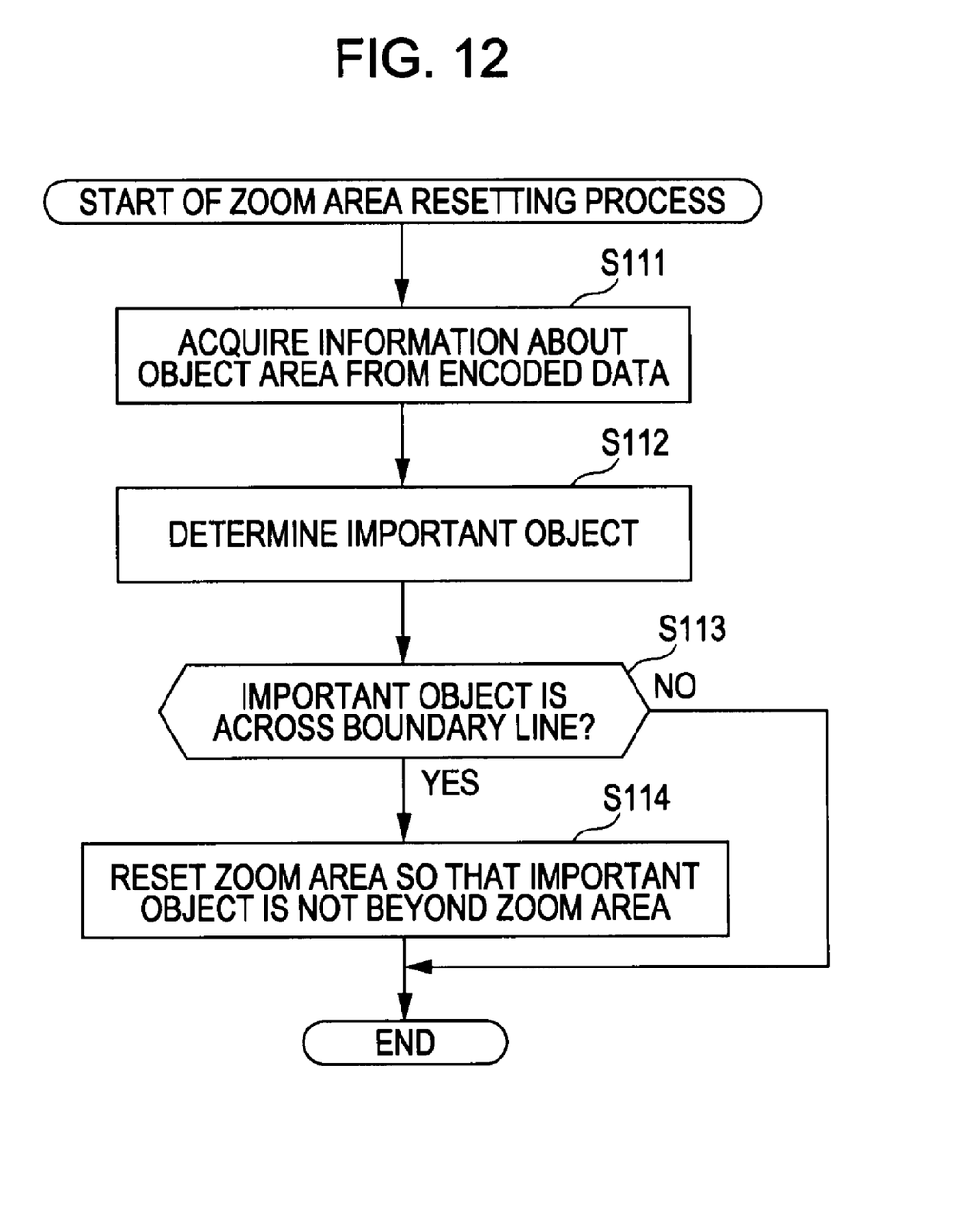
FIG. 12 is a flowchart showing an example of another zoom area resetting process in the image processing apparatus according to an embodiment of the present invention.

FIG. 12 is a flowchart showing an example of another zoom area resetting process in the image processing apparatus 1 according to an embodiment of the present invention. The important object is detected from encoded data in the zoom area resetting process in FIG. 12.

In Step S111, the important object detecting unit 13 acquires information about the area of an object from encoded data.

In Step S112, the important object detecting unit 13 estimates the importance level of each object that is acquired to determine the important object. The important object detecting unit 13 estimates the importance level, for example, on the basis of whether the pixel has a pixel value indicating the flesh color, as in the important object determination described above.

In Step S113, the zoom area resetting unit 14 determines whether the important object determined in Step S112 is across the boundary line. If the zoom area resetting unit 14 determines that the important object is not across the boundary line, the zoom area resetting process is terminated.

If the zoom area resetting unit 14 determines in Step S113 that the important object is across the boundary line, then in Step S114, the zoom area resetting unit 14 resets the zoom area so that the important object is not beyond the zoom area. In other words, the zoom area resetting unit 14 supplies the zoom signals corresponding to the zoom area reset so that the important object is not beyond the zoom area to the zoom processing unit 16. The zoom processing unit 16 determines the zoom area on the basis of the zoom signals and supplies the determined zoom area to the image output unit 17 as the zoom image. Then, the zoom area resetting process is terminated.

As described above, when the information about the important object can be acquired from the encoded data, it is possible to reset the zoom area so that the important object is not beyond the zoom area on the basis of the acquired information.

The series of processing described above may be performed by hardware or may be performed by software. When the series of processing is performed by software, the programs composing the software are installed from the program recording medium into a computer incorporated in dedicated hardware or into a general-purpose personal computer capable of installing various programs to execute various functions.

Figure 13:
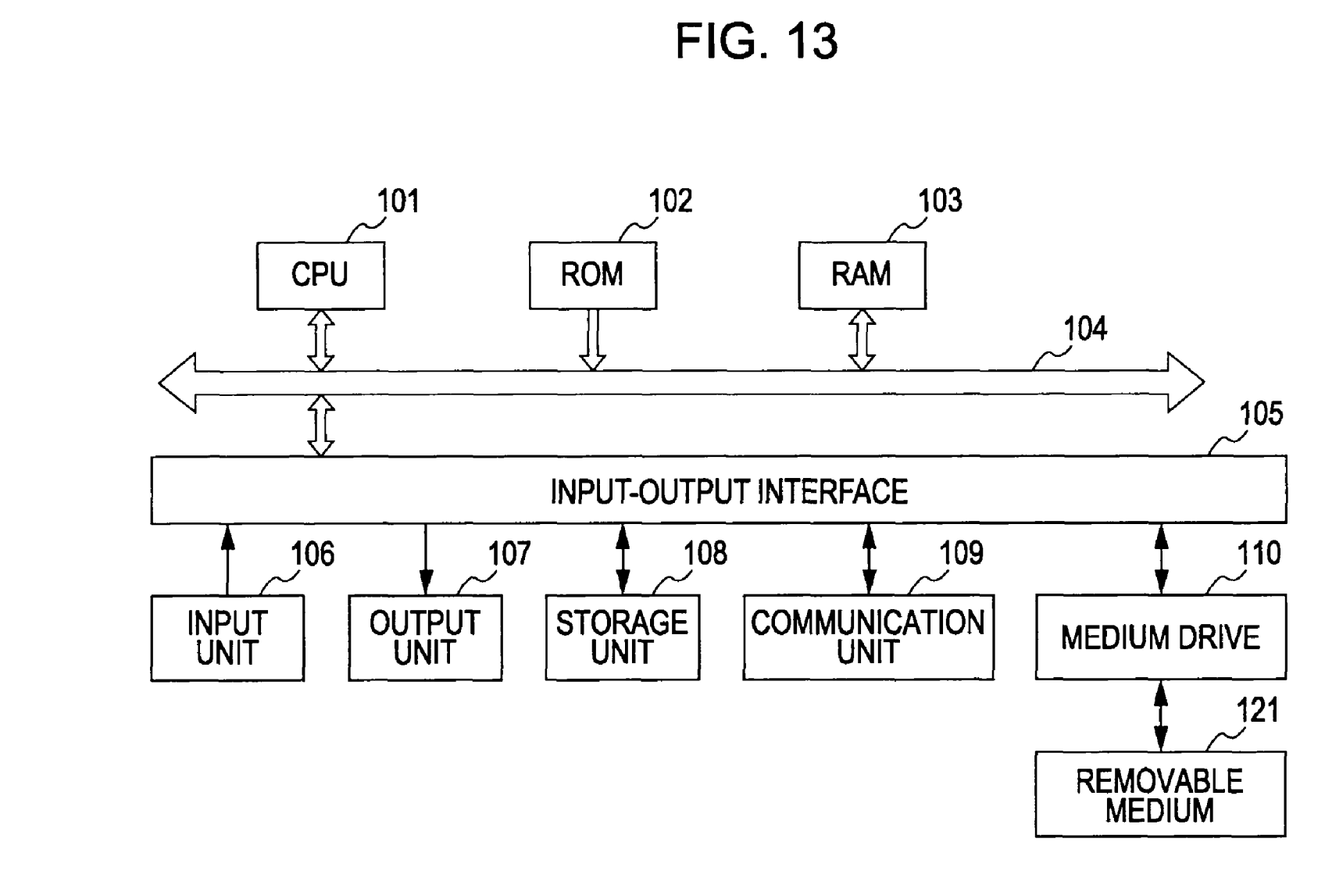
FIG. 13 is a block diagram showing an example of the hardware configuration of a computer according to an embodiment of the present invention.

FIG. 13 is a block diagram showing an example of the hardware configuration of a computer performing the series of processing described above with the programs.

In the computer in FIG. 13, a central processing unit (CPU) 101, a read only memory (ROM) 102, and a random access memory (RAM) 103 are connected to each other via a bus 104.

An input-output interface 105 is also connected to the bus 104. An input unit 106 including a keyboard, a mouse, and a microphone, an output unit 107 including a display and a speaker, a storage unit 108, a communication unit 109, and a medium drive 110 are connected to the input-output interface 105. The storage unit 108 is, for example, a hard disk or a non-volatile memory. The communication unit 109 is, for example, a network interface. The medium drive 110 drives a removable medium 121, such as a magnetic disk, an optical disk, a magneto-optical disk, or a semiconductor memory.

In the computer having the above configuration, the CPU 101 loads programs stored in the storage unit 108 in the RAM 103 through the input-output interface 105 and the bus 104 and executes the programs to perform the series of processing described above.

The programs to be executed by the computer (the CPU 101) are recorded in the removable medium 121, which is a package medium, such as a magnetic disk (including a flexible disk), an optical disk (for example, a compact disc-read only memory (CD-ROM) or a DVD), a magneto-optical disk, or a semiconductor memory, and are supplied to the computer through the removable medium 121. Alternatively, the programs are supplied to the computer through a wired or wireless transmission medium, such as a local area network, the Internet, or digital satellite broadcasting.

The programs may be installed in the storage unit 108 through the input-output interface 105 with the removable medium 121 loaded in the medium drive 110. The programs may be received by the communication unit 109 through the wired or wireless transmission medium and may be installed in the storage unit 108. In addition, the programs may be installed in the ROM 102 or the storage unit 108 in advance.

The programs executed by the computer may be processed in time series in the described sequence, may be processed in parallel, or may be processed in response to a call.

The steps in the flowchart in the above embodiments of the present invention may be performed in time series in the described sequence or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    display means for displaying a zoom image resulting from enlargement of a certain area in an original image to a zoom area;
    important object determining means for determining whether an absolute value of a difference in pixel value between each of a plurality of pixels on a boundary line, which is the outermost circumference of the zoom area, and each of pixels that respectively adjoin each of the plurality of pixels on the boundary line in a direction perpendicular to the boundary line and away from the zoom area is lower than or equal to a predetermined threshold value to determine whether an important object is across the boundary line based on a maximum counted value of a number of times the absolute value of the difference is determined to be lower than or equal to the predetermined threshold value over the boundary line; and
    resetting means for resetting a zoom parameter used for determining the zoom area when the important object determining means determines that an important object is across the boundary line.

2. The image processing apparatus according to claim 1, wherein the important object determining means sequentially performs the determination of whether the absolute value of the difference in pixel value between the pixels adjoining to each other in the direction perpendicular to the boundary line is lower than or equal to the predetermined threshold value in the direction away from the zoom area and from a pixel on the boundary line when outputting the number of times the absolute value of the difference is determined to be lower than or equal to the predetermined threshold value, and
    wherein the resetting means resets the zoom parameter on the basis of the output number of times.

3. The image processing apparatus according to claim 1, wherein the area of the important object is a person image area.

4. The image processing apparatus according to claim 1, wherein the area of the important object is an artificial image area.

5. The image processing apparatus according to claim 1, wherein the area of the important object is a non-background image area.

6. The image processing apparatus according to claim 1, wherein the zoom parameter is a positional parameter identifying the zoom area in the original image or a parameter indicating a zoom magnification.

7. An image processing method displaying a zoom image resulting from enlargement of a certain area in an original image to a zoom area in certain displaying means, the method comprising the steps of:
    determining whether an absolute value of a difference in pixel value between each of a plurality of pixels on a boundary line, which is the outermost circumference of the zoom area, and each of pixels that respectively adjoin each of the plurality of pixels on the boundary line in a direction perpendicular to the boundary line and away from the zoom area is lower than or equal to a predetermined threshold value to determine whether an important object is across the boundary line based on a maximum counted value of a number of times the absolute value of the difference is determined to be lower than or equal to the predetermined threshold value over the boundary line; and
    resetting a zoom parameter used for determining the zoom area when it is determined that an important object is across the boundary line.

8. A non-transitory computer readable storage medium that stores a program which when executed by a computer, causes the computer to perform a method of image processing in which a zoom image resulting from enlargement of a certain area in an original image to a zoom area is displayed in certain displaying means, the method comprising the steps of:
    determining whether an absolute value of a difference in pixel value between each of a plurality of pixels on a boundary line, which is the outermost circumference of the zoom area, and each of pixels that respectively adjoin each of the plurality of pixels on the boundary line in a direction perpendicular to the boundary line and away from the zoom area is lower than or equal to a predetermined threshold value to determine whether an important object is across the boundary line based on a maximum counted value of a number of times the absolute value of the difference is determined to be lower than or equal to the predetermined threshold value over the boundary line; and resetting a zoom parameter used for determining the zoom area when it is determined that an important object is across the boundary line.

9. An image processing apparatus comprising:

a display unit that displays a zoom image resulting from enlargement of a certain area in an original image to a zoom area;

an important object determining unit, implemented by a processor, that determines whether an absolute value of a difference in pixel value between each of a plurality of pixels on a boundary line, which is the outermost circumference of the zoom area, and each of pixels that respectively adjoin each of the plurality of pixels on the boundary line in a direction perpendicular to the boundary line and away from the zoom area is lower than or equal to a predetermined threshold value to determine whether an important object is across the boundary line based on a maximum counted value of a number of times the absolute value of the difference is determined to be lower than or equal to the predetermined threshold value over the boundary line; and a resetting unit that resets a zoom parameter used for determining the zoom area when the important object determining unit determines that an important object is across the boundary line.

* * * * *